United States Patent [19]

Knudson

[11] Patent Number: 4,982,658
[45] Date of Patent: Jan. 8, 1991

[54] BALE SHREDDING DEVICE

[76] Inventor: Leroy Knudson, P. O. Box 3, Consort, Alberta, Canada, TOC 1B0

[21] Appl. No.: 295,735

[22] Filed: Jan. 11, 1989

[30] Foreign Application Priority Data

Jan. 12, 1988 [CA] Canada ................................. 556307

[51] Int. Cl.$^5$ .......................... B65B 13/00; B30B 9/00
[52] U.S. Cl. ..................................... 100/007; 100/95; 100/100; 100/102; 100/179; 100/215; 100/188 R; 241/101 A; 241/101.7; 414/24.6
[58] Field of Search ............. 241/101.7, 152 A, 101.4, 241/101 A; 414/24.6, 24.5; 100/7, 39, 94, 95, 98 R, 100, 102, 179, 188 R, 189, 215, 218

[56] References Cited

U.S. PATENT DOCUMENTS

| | | | |
|---|---|---|---|
| 2,561,069 | 7/1951 | Peterson | 100/94 X |
| 3,527,417 | 9/1970 | Tompsett | 241/101.7 |
| 4,034,920 | 7/1977 | Bradley | 241/101.7 |
| 4,088,272 | 5/1978 | Grillot | 241/101.7 X |
| 4,195,958 | 4/1980 | Vahlkamp et al. | 414/24.6 |
| 4,376,607 | 3/1983 | Gibson | 414/24.6 |
| 4,441,845 | 4/1984 | Gibson | 414/24.6 |
| 4,498,830 | 2/1985 | Seymour et al. | 414/24.6 |
| 4,524,916 | 6/1985 | Keyes et al. | 241/101 A |
| 4,538,949 | 9/1985 | Liet et al. | 414/24.6 |
| 4,597,703 | 7/1986 | Bartolini | 414/24.6 |
| 4,688,729 | 8/1987 | Hobson, Sr. | 241/101.7 |

FOREIGN PATENT DOCUMENTS 1028654 3/1978 Canada .
1186598 5/1985 Canada .

Primary Examiner—Philip R. Coe
Assistant Examiner—Stephen F. Gerrity
Attorney, Agent, or Firm—Stevens, Davis, Miller & Mosher

[57] ABSTRACT

An apparatus for handling round bales of hay, straw or the like material. In general terms, the handling comprises dispensing a round bale of hay or the like material by unwinding the bale and feeding the thus produced continuous mat into the inlet device of a compactor, typically employing the compacting mechanism of a known square baler. The compactor compacts the material fed into it to produce a second, compacted state generally similar to square bales. Thus, in brief, the invention converts the round bales into the square bales. In a particularly preferred application of the invention, the continuous compact mass of the material is fed directly into a grinder-mixer. The grinder-mixer, being usually on a mobile frame, can thus be fed from a round bale. Since the volume of the round bale is a high multiple of that of hand-fed square bales, which have usually been used for adding hay into a grinder mixer, the use of the invention eliminates labor intensive hand feeding of the grinder-mixer while at the same time the production rate of the bale making is high as round bales are used for the purpose, rather than square bales.

4 Claims, 4 Drawing Sheets

BALE SHREDDING DEVICE

FIELD OF THE INVENTION

The present invention relates to the processing of hay, straw or the like material.

BACKGROUND OF THE INVENTION

It has long been recognized that it is advantageous to store hay in a compact state. To this end, pick-up balers have been known for many decades. In general terms, a pick-up baler is used to bale hay or straw directly from the windrow in the field. The hay is picked up by prongs and passed to the auger which pushes it to the feed prongs. The feed prongs, in turn, deliver the hay to the bale chamber on each stroke of a compressing plunger. The plunger compresses the hay to compact layers and the bales of hay are usually automatically tied with wire or twine. The advantage of square bales is in their relatively high degree of compactness which results in good economy of subsequent handling which may include untying the bales and dispensing same for the cattle as a fodder or feeding same into standardized processing devices such as a grinder-mixer. Modern grinder-mixers are usually mounted on a mobile frame and are typically brought to the field at which location fodder ingredients to be ground and mixed and including a substantial part of hay, are added into the machine and mechanically processed. The hay component is hand fed into the mixing device in the form of square bales. The feeding mechanism of the mixer grasps the bale and advances the hay further to the grinding/mixing mechanism of the device. Since the grinding and mixing device is usually of a high performance type, a continuous attention is required at the feeding of the hay.

While providing good economy for storage, the compacted square bales are relatively expensive to produce from the standpoint of energy required for compacting the material into the bales. The economy of forming bales of hay or the like material has been improved by switching to so-called round bales. The round bales are typically of a large diameter, often of about three meters in diameter. They are produced by what could generally be referred to as a winding or coiling operation without any attempts being made to compact the hay other than by the weight of the bale itself. The round bales have become very popular because they do not require special storage facilities. Their cylindric shape is suitable even for leaving the bales in the field and then dispensing same for the cattle as fodder, at a later time. However, if desired, the bales can be transported to a central storage place and various devices for handling the round bales have been proposed and are in operation, from the stage of forming the bales to the dispensing of same into shredding or other processing machines.

The disadvantage of the round bales is in their volume and in their weight, which make them unsuitable for manual handling. The relatively low density is usually compensated for by the speed of making the bales, which is much higher per volume unit than that of square bale making.

Among numerous devices for handling and processing round bales, U.S. Pat. No. 4,088,272 (Grillot) should be mentioned which shows a machine adapted to be towed behind a tractor for loading, shredding and feeding a cylindrical bale of hay. A discharge conveyor receives the hay from the auger and discharges it to the side of the machine for deposit in the windrow on the ground or into a feed bunk as the machine is moved by the tractor.

Another round bale dispensing device is shown in Canadian Patent No. 1,028,654 (Guichon). Here, the bale is supported by a series of supporting rollers which can be driven to "unwind" the bale and to dispense the thus formed material.

Another bale handling apparatus for processing round bales is described in Gibson U.S. Pat. No. 4,376,607, Bartolini U.S. Pat. No. 4,597,703, and in Vahikamp et al. U.S. Pat. No. 4,195,958.

OBJECTS OF THE INVENTION

It is an object of the present invention to provide an apparatus which handles hay or the like fibrous material and utilizes the advantages of the ease of producing the round bales with those of selective use of the hay or the like in the form of a highly compacted square bale or the like configuration.

SUMMARY OF THE INVENTION

In general terms and in one aspect of the present invention, an apparatus is provided for processing round bales of hay or the like material comprising, in combination: round bale dispensing device of the type including a bale support means provided with a bale drive mechanism for unwinding a supported bale to thus form a mat of said material and feeding the mat to a discharge end of the dispensing device; said discharge end communicating with an inlet of a compressing device, said compressing device including forming means at a discharge end thereof to form the material to a predetermined compact product of rectangular cross-sectional configuration; outlet means for discharging the compact product for further processing of said material.

DETAILED DESCRIPTION OF THE INVENTION

The invention will now be described in greater detail by way of the enclosed simplified diagrammatic drawings wherein:

DESCRIPTION OF THE PREFERRED EMBODIMENTS

Figure 1:
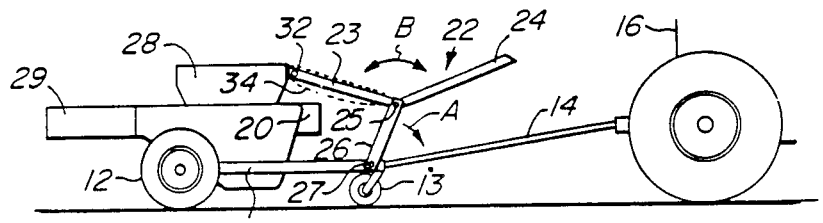
FIGS. 1-5 present a diagrammatic representation of one of many possible arrangements of a device for carrying out the method of the present invention, it being understood that the elements of the combination of the apparatus of the present invention are known and in many instances are formed by a known machine available on the market, or can be substituted by a modified type of the device carrying out generally the same function.
Figure 2:
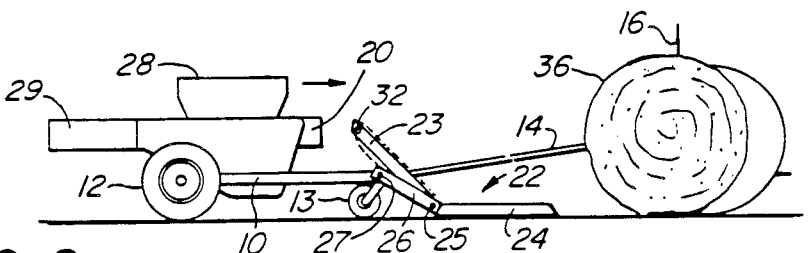
Figure 3:
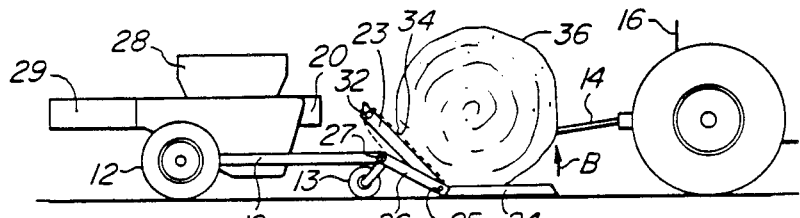
Figure 4:
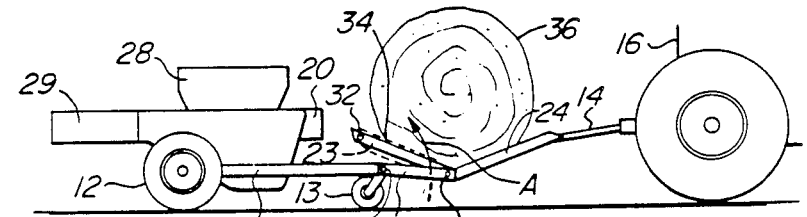

Before proceeding with the detailed description, it is to be emphasized, once again, that the different integers of the device for performing the present invention are well known in themselves. Therefore, the understanding of the present invention does not require that they be described in a very substantial detail.

The corresponding parts in all of the drawings accompanying the present application are marked with the same reference numerals, even though some of the representations are purely diagrammatic while others may be shown in a somewhat greater detail.

Figure 7:
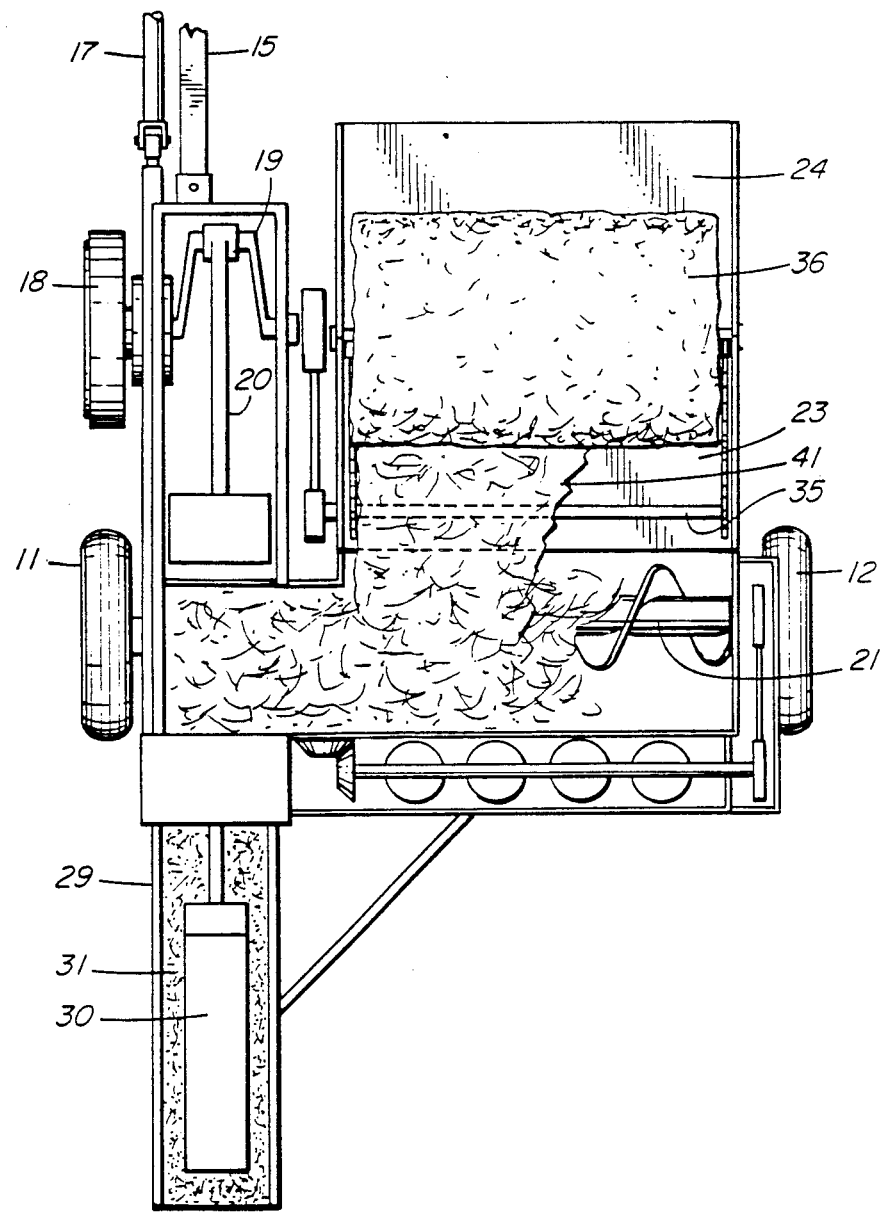
FIG. 7 is a view similar to FIG. 5 but showing a top plan view of the device, again in a sketchy, diagrammatic view.

Reference may now be had briefly to what is shown in FIGS. 1–5. Reference numeral 10 designates a frame which is mobile on a pair of rear wheels 11, 12. A front wheel 13 is mounted at the right hand side of the frame 10. There is no front wheel at the left hand side since the left hand portion of the frame 10 is generally integral with and supported by a towing bar and drive shaft assembly 14. The towing bar and drive shaft assembly 14 comprises a towing bar 15 removably secured to a towing vehicle such as tractor 16, while the drive shaft 17 is suitably connected to a driving unit of the tractor 16, as is well known in the art. The drive shaft 17 is adapted to drive, via known transmission and gearbox mechansims, various parts of the shown device, as referred to hereinafter. Again, the drive mechanism and the way the driving motion of the drive shaft 17 is distributed does not form a part of the invention and is therefore referred to only diagrammatically, particularly in FIG. 7. It is indicated in FIG. 7 that there is a flywheel 18 connected to a crankshaft 19 operatively associated with a plunger 20 reciprocating in a generally horizontal plane. Reference numeral 21 designates an auger for feeding the material to the region of the plunger 20, at the left of FIG. 7.

It is one of the features of the present invention that the material to be fed to the auger comes directly from a round bale supported, as an example, on a supporting table 22 which is comprised of two arm sections 23, 24 fixedly secured to each other to maintain an obtuse-angled mutual relationship as best seen int he series of FIGS. 1–6. As in the case of preceding elements of the device for performing the method of the present invention, the mechanism of the supporting table 22 per se is known in the art and can be substituted by many other handling mechanisms for dispensing round bales, for instance with the round bale handling mechanism s described in the aforesaid U.S. Pat. No. 4,088,272, Canadian Patent No. 1,028,654 and/or U.S. Pat. No. 4,195,958 as well as Canadian Patent No. 1,186,598, the latter of which presents an exemplary representation of a supporting table comprised of two wings at an obtuse-angled arrangement as set forth.

The obtuse-angled arrangement of the table sections 23, 24 is pivotable about pivot point 25 in the directions of arrow A (FIG. 1). The pivot 25 is mounted at the free end of a bracket 26 which itself is pivotably secured to the frame 10 for pivoting about a pivot point 27 from an upright position shown in FIG. 1 to a downwardly and forwardly sloping position of FIG. 2. The pivoting of the bracket 26 is indicated with an arrow B (FIG. 1). The free end of the arm section 23 is so disposed that it is near the upper end of a hopper of a compactor 28 the exemplary arrangement of which is best visible in FIG. 7. Briefly, it combines the feature of the auger 21, possibly with a system of tines (not shown) to deliver the processed material to the left of FIG. 7, into the proximity of the plunger 20 at a forward end thereof, to be compacted by the plunger 20 and thus delivered to a bale chute 29 the top of which is provide with a pressure plate 30 for controlling the degree of compactness of the processed material 31, as is well known in the art.

The material 31 coming out of the machine is compacted and formed to the shape of regular square bales.

Figure 6:
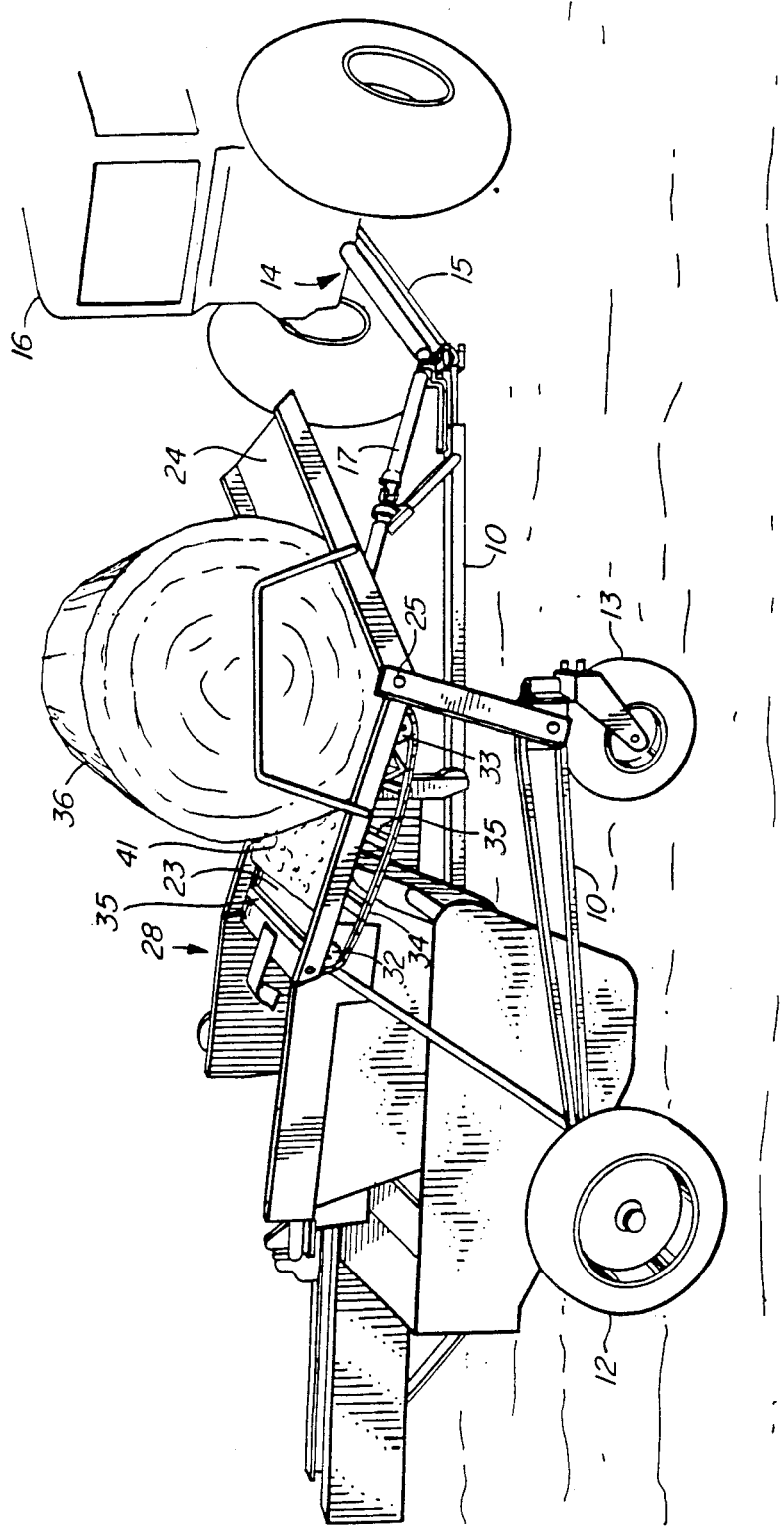
FIG. 6 is a simplified diagrammatic perspective view of a prototype of a device according to the present invention, the prototype being shown at a stage corresponding in function to that of FIG. 5.

In accordance with the known arrangement of the round bale dispensing devices, the arm section 23 is provided with two pairs 32, 33 of rotary guide sprocket wheels connected for rotation in common. They guide, at each side of the table, a chain 34 carrying a plurality of transverse rods 35 (FIGS. 6 and 7). There is a narrow gap between the arm sections 23 and 24 of the supporting table 22 so that the transverse rods 35 can pass from beneath the arm section 23 to above the arm section 23, under a bale 36 which may be placed thereon as will be described hereinafter.

Figure 8:
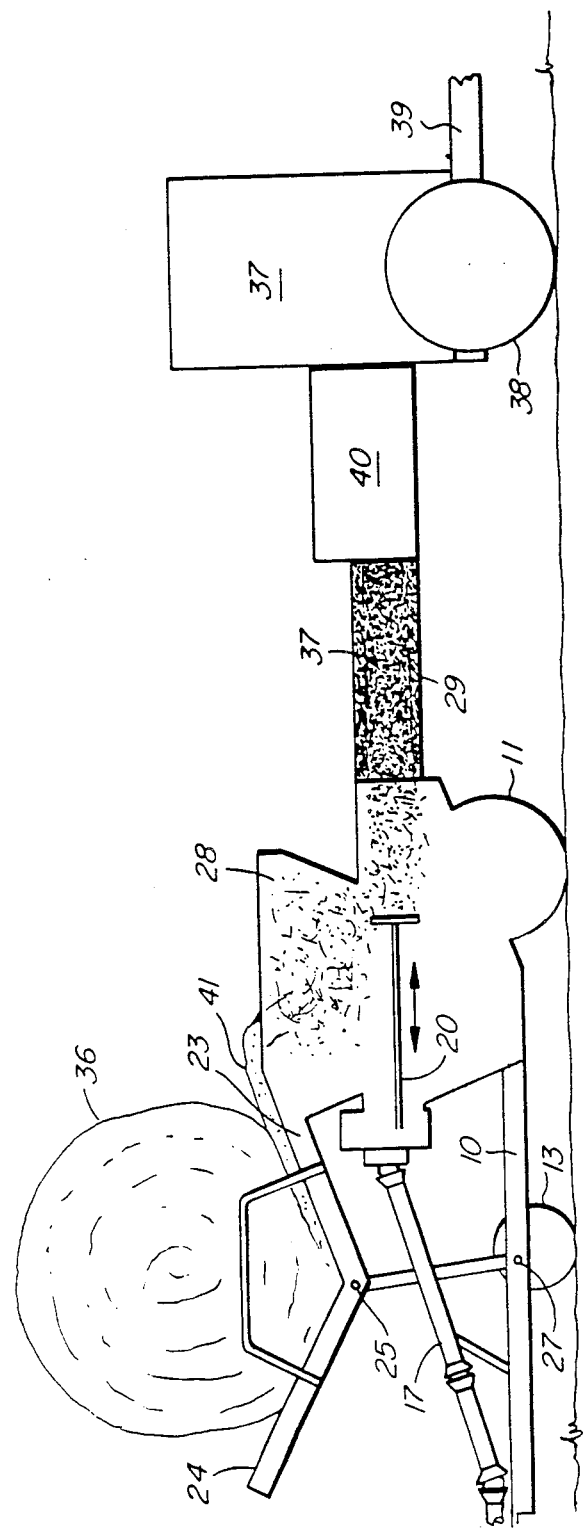
FIG. 8 is a diagrammatic side view similar to that of FIGS. 1-5 but showing the arrangement as being coupled with a grinder-mixer.

Turning now to the embodiment of FIG. 8, the device as described above is shown in a diagrammatic way as being operatively associated with a grinder-mixer 37. The structure of a grinder-mixer is well known and does not form a part of the present invention. It is therefore shown only n a diagrammatic way. The diagrammatic representation of the grinder-mixer 37 includes wheels 38 and a towing bar 39 to indicate that the grinder mixer 38 is mobile. In practice, it is usually brought to the field and placed at a predetermined location. As is well known, the device is provided with a feeding mechanism 40 adapted to engage standard size compact bales of hay and to advance same to the grinder.

In the application of the present invention, as shown in FIG. 8, the round bale converting machine is backed to the mixer-grinder such that the bale chute 29 discharges directly into the the feeding mechanism 40 of the grinder/mixer, eliminating the need for tying the square bales or for a manual feeding of the grinder-mixer.

Figure 5:
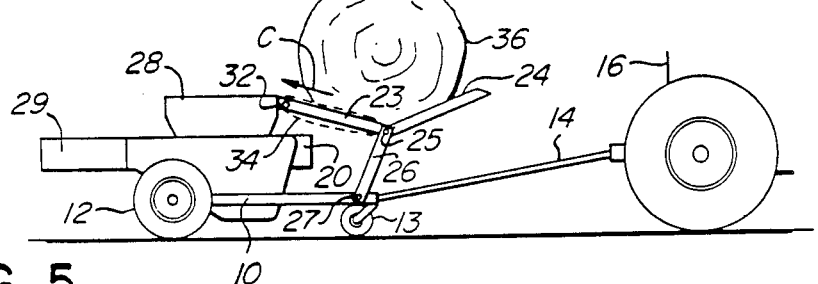

In the position shown in FIG. 8, the transverse rods 35 are driven about guide wheels 32, 33 toward the compactor 28 as shown in FIG. 5. The direction of movement of the upper flight of the chain 34 (and thus rods 35) is designated with an arrow C. This movement results in the clockwise turning of the bale 36 now supported on the supporting table 22. Thus, a mat 41 (FIG. 6) is produced which is fed directly into the upper part of a hopper of the compactor 28. The mat 41 is eventually delivered into the area of plunger 20. The material received from the mat 41 is gradually compacted into a compact mass fed directly to the feeding mechanism 40 of the grinder-mixer 37.

Due to the large volume and weight of the round bale 36, the feeding of the grinder-mixer can be carried out for a substantially longer period without the need for manual feeding by the operator.

It follows from the above description that the operation according to the method of the present invention can be carried out by many different embodiments of devices most of which are either readily available on the market or require only a minimum modification. In the method of the present invention, the round bale 35 is processed in generally the same way as a windrow of hay. This requires the bale 36 to be placed on the supporting table 22 or other equivalent.

The placement of the round bale can be achieved in many different ways which are diagrammatically indicated in the sequence of FIGS. 1-5 by pivoting the table 22 about pivot 27 such that the pivot point 25 is generally coincident with the ground (arrow A in FIG. 1). At the same time, the table 22 is pivoted (arrow B) counterclockwise relative to and about the pivot 25 so that the overall assembly can reach the position of FIG. 2. Since the towing bar and the drive shaft assembly 14 is disposed to one side of the frame of the device, the tractor 16 can now drive the entire machine such that the arm section 24 cuts under the bale 36. With the subsequent pivoting of the supporting table 22 about the pivot 25 (arrow B of FIG. 3), the bale 36 becomes eventually supported as in FIG. 4 and, by raising the arm section 24 cuts under the bale 36. With the subsequent pivoting of the supporting table 22 about the pivot 25 (arrow B of FIG. 3), the bale 36 becomes eventually supported as in FIG. 4 and, by raising the arm 26 as shown by arrow A in FIG. 4 (simultaneously clockwise pivoting of the table 22 about 25 to maintain same in horizontal state) the bale 36 is brought to the position of FIG. 5. At this position, the operation of the present invention may begin.

The description of the loading of the bales onto the table, or the structure of the table itself are intended to show only an exemplary embodiment, it being understood that the dispensing of the bale 36 into the compactor 28 can be carried out by many other different ways which are well known in the art and many of which can also be readily recognized from prior art patents referred to at the beginning of this disclosure.

The state of the arrangement is now shown in FIG. 6. As already described, the bale 36 is dispensed into a mat of the hay or the like material from which the bale 35 is made. The mat 41 is fed into the inlet of the compacting device 28. Within the compacting devices (see the diagrammatic representation of FIG. 8 and also FIG. 7), the hay is compacted into the form of a generally continuous flow of said material 31. The material has a predetermined cross-sectional configuration, preferably that of a standard square bale. The flow of the material 31 is advanced and is subjected to a further processing stage. In the described embodiments of the method of the present invention, the "processing stage" can be either the tying of the bales by way of a standard twine tying mechanism well known in the art, or by grasping with the feeding mechanism 40 of a grinder-mixer, the processing by the grinder-mixer itself being a further stage of the processing of the material.

The method of the invention can be carried out by only minor modifications of an existing baler generally along the lines as shown. As mentioned throughout the specification, the predominent feature of the present invention is in the method. The method presents an extremely simple way of improving the efficiency of processing hay by converting a round bale of relatively low compactness but great weight to square bales of relatively low weight and high compactness, while utilizing, for all practical purposes, arrangements and machinery the individual parts or elements are already known in the art.

Since many modifications are possible in the arrangement of the machines on which the method of the present invention can be carried out, it is to be understood that the above description of the method and of the apparatus is intended only as an exemplary embodiment and is not to be viewed as limiting the scope of protection. I wish to embody within the scope of protection afforded by a patent which may issue hereon all arrangements which properly fall within the scope of my contribution to the art.

The embodiments of the invention in which an exclusive property or privilege is claimed are defined as follows:

1. Apparatus for processing round bales of hay or like material, comprising, in combination:
    (a) a round bale dispensing device including a discharge end and a bale support means provided with a bale drive mechanism for unwinding a supported bale to thus form a mat of said material and feeding the mat to said discharge end;
    (b) a compressing device having an inlet and a discharge end said discharge end of the bale dispensing device communicating with the inlet of the compressing device, said compressing device also including rectangular cross-section forming means at said discharge end thereof, to form the material to a predetermined compact product;
    (c) a grinder-mixer having an inlet, said discharge end of the compressing device including outlet means connected to said inlet of said grinder-mixer for further processing of said material by said grinder-mixer.

2. Apparatus as claimed in claim 1, wherein the compressing device includes a tying mechanism for tying said compact product into a bale, whereby the apparatus is capable of converting round bales to rectangular bales.

3. Apparatus as claimed in claim 1 fixedly secured to a mobile frame and including a tow-bar means for towing said apparatus and mobile frame to a selected location, whereby the round bales can be loaded onto the dispensing device and said compact product discharged at different selected locations.

4. Apparatus for feeding hay or like material into a grinder mixer having an inlet, said apparatus including, in combination:
    (a) round bale dispensing means for forming a mat of said material by unwinding a round bale of said material;
    (b) compacting means communicating with said dispensing means for receiving said mat and compacting said material to a compact state;
    (c) forming means for forming the compacted material into a bale having a shape of generally rectangular cross-section;
    (d) said round bale dispensing means having a discharge means communicating with said inlet of the grinder-mixer for a continuous feeding of the compacted material from the forming means into the grinder-mixer; whereby hand-feeding of compact rectangular cross-section bales into the grinder mixer is eliminated.

* * * * *